(12) United States Patent
Ma et al.

(10) Patent No.: US 12,398,576 B2
(45) Date of Patent: Aug. 26, 2025

(54) COMPOSITE CROSSARM AND POWER TRANSMISSION TOWER

(71) Applicant: JIANGSU SHEMAR ELECTRIC CO., LTD., Jiangsu (CN)

(72) Inventors: Bin Ma, Nantong (CN); Jie Yu, Nantong (CN); Qing Huang, Nantong (CN)

(73) Assignee: JIANGSU SHEMAR ELECTRIC CO., LTD., Jiangsu (CN)

( * ) Notice: Subject to any disclaimer, the term of this patent is extended or adjusted under 35 U.S.C. 154(b) by 0 days.

(21) Appl. No.: 17/630,638

(22) PCT Filed: Sep. 28, 2021

(86) PCT No.: PCT/CN2021/121374
§ 371 (c)(1),
(2) Date: Jan. 27, 2022

(87) PCT Pub. No.: WO2022/179103
PCT Pub. Date: Sep. 1, 2022

(65) Prior Publication Data
US 2024/0110403 A1    Apr. 4, 2024

(30) Foreign Application Priority Data
Feb. 24, 2021   (CN) .......................... 202110206474.1

(51) Int. Cl.
*E04H 12/24*    (2006.01)
*H01B 17/10*    (2006.01)
*H02G 7/20*     (2006.01)

(52) U.S. Cl.
CPC ............. *E04H 12/24* (2013.01); *H01B 17/10* (2013.01); *H02G 7/205* (2013.01)

(58) Field of Classification Search
CPC ........ H01B 17/10; H01B 17/02; H01B 17/04; H02G 7/205; H02G 7/20; E04H 12/24
See application file for complete search history.

(56) References Cited

U.S. PATENT DOCUMENTS

| | | | |
|---|---|---|---|
| 10,476,249 B2* | 11/2019 | Lindsey | H02G 7/20 |
| 11,283,254 B2* | 3/2022 | Ma | E04H 12/34 |
| 11,551,835 B2* | 1/2023 | Lindsey | H01B 17/04 |

FOREIGN PATENT DOCUMENTS

| | | | |
|---|---|---|---|
| CN | 103291114 A | | 9/2013 |
| CN | 203247930 U | * | 10/2013 |

(Continued)

OTHER PUBLICATIONS

Kimoto, I, et al., Insulator Crossarms for 345-KV EHV Transmission Line, IEEE Transactions on Power Apparatus and Systems, vol. pas-90, No. 2, pp. 756-767 (1971).

(Continued)

*Primary Examiner* — Adriana Figueroa
(74) *Attorney, Agent, or Firm* — Taft Stettinius & Hollister LLP

(57) ABSTRACT

The present disclosure discloses a composite crossarm and a power transmission tower. The composite crossarm includes two post insulators and two suspension insulators. Of the two post insulators and the two suspension insulators, one ends are configured to be connected to a tower body of a power transmission tower, and the other ends are connected together to form an end portion of the composite crossarm to hang a power transmission line. The two suspension insulators are located on same sides of the two post insulators and respectively arranged adjacent to the two post insulators. At the same time, an angle between the two post insulators ranges from 20° to 50°, and an angle between the post insulator and the suspension insulator adjacent thereto (Continued)

ranges from 15° to 45°. The composite crossarm according to the present disclosure is highly stable and convenient to for mounting grading ring.

13 Claims, 10 Drawing Sheets

(56) References Cited

FOREIGN PATENT DOCUMENTS

| CN | 205189481 U | * | 4/2016 | |
|---|---|---|---|---|
| CN | 106049968 A | | 10/2016 | |
| CN | 205617888 U | | 10/2016 | |
| CN | 106930594 A | | 7/2017 | |
| CN | 107762247 A | | 3/2018 | |
| CN | 107887086 A | | 4/2018 | |
| CN | 208027821 U | * | 10/2018 | ............. H01B 17/14 |
| CN | 208460502 U | * | 2/2019 | |
| CN | 209293540 U | | 3/2019 | |
| CN | 208706336 U | * | 4/2019 | |
| CN | 211229726 U | * | 8/2020 | |
| CN | 112012553 A | | 12/2020 | |
| CN | 112252811 A | | 1/2021 | |
| CN | 212478729 U | * | 2/2021 | |
| CN | 112878788 A | | 6/2021 | |
| CO | 92302249 | | 5/1989 | |
| CO | 20190003947 A1 | | 4/2019 | |
| JP | S4814600 U | | 2/1973 | |
| JP | H07308016 A | | 11/1995 | |
| JP | 2013128357 A | | 6/2013 | |
| JP | 2016502832 A | | 1/2016 | |
| WO | 2022179114 A1 | | 9/2022 | |

OTHER PUBLICATIONS

Australian Office Action for corresponding Application No. 2021429593 dated Apr. 11, 2024, 4 pages.
Colombian Office Action for corresponding Application No. 20220012762 dated Feb. 9, 2024.
European Search Report for corresponding Application No. 21835146.8 dated Apr. 10, 2024.
International Search Report for Application No. PCT/CN2021/121374, dated Jan. 4, 2022, 4 pages.
Written Opinion for Application No. PCT/CN2021/121374, dated Jan. 4, 2022, 5 pages.
Japanese Patent Office, Office Action issued in corresponding Application No. 2023-550081, dated Aug. 6, 2024, 9 pp.
Resolution of Notification of the Expert's Report for corresponding Application No. 2022-000569 dated Jun. 12, 2023, 13 pages.
Japanese Patent Office, Notice of Allowance issued in corresponding Application No. 2023-550081, dated Nov. 13, 2024, 11 pp.
Korean Patent Office, Office Action issued in corresponding Application No. 10-2023-7028099, dated Jan. 22, 2025, 13 pp.

* cited by examiner

COMPOSITE CROSSARM AND POWER TRANSMISSION TOWER

CROSS REFERENCE TO RELATED APPLICATIONS

This is a U.S. National Stage application of, and claims priority to, PCT/CN2021/121374, filed Sep. 28, 2021, which further claims priority to Chinese Patent Application No. 202110206474.1, filed Feb. 24, 2021, the disclosures of which are incorporated herein by reference in their entirety.

TECHNICAL FIELD

The present disclosure relates to the field of power transmission technologies, and in particular, to a composite crossarm and a power transmission tower.

BACKGROUND

A composite material is one of the ideal materials for constructing a transmission tower structure due to its advantages of light weight, high strength, corrosion resistance, easy machining, designability and good insulation performance. Moreover, the tower made of the composite material has advantages of light weight, a small tower head size, a light structure, easy shaping, low costs of transportation and assembly, corrosion resistance, high and low temperature resistance, high strength, low possibility of theft and low costs of line maintenance.

The inventor of the present disclosure finds that the performance of the tower made of the composite material at present is to be improved. Moreover, a current composite crossarm is generally formed by a combination of a post insulator and a suspension insulator, including a single-post structure, a single-post and single-suspension structure, a two-post and single-suspension structure and so on. When the post insulator or the suspension insulator of the single-post or single-suspension structure breaks, the whole composite crossarm may fail. Therefore, there is a need to provide a more stable composite crossarm structure.

SUMMARY

An objective of the present disclosure is to provide a composite crossarm and a power transmission tower, which can ensure stability of the composite crossarm and provide favorable conditions for mounting a first grading ring on a post insulator and mounting a second grading ring on a suspension insulator.

In order to solve the above technical problem, one technical solution adopted in the present disclosure is as follows. A composite crossarm is provided, wherein the composite crossarm includes two post insulators and two suspension insulators, of the two post insulators and the two suspension insulators, one ends are configured to be connected to a tower body of a power transmission tower, and the other ends are connected together to form an end portion of the composite crossarm to hang a power transmission line, wherein the two suspension insulators are located on a same side of the two post insulators and respectively arranged adjacent to the two post insulators, and at the same time, an angle between the two post insulators ranges from 20° to 50°, and an angle between the post insulator and the suspension insulator adjacent thereto ranges from 15° to 45°.

In the composite crossarm, on the one hand, the two post insulators and the two suspension insulators are provided and connected together to form the end portion configured to hang the power transmission line, so that a stable triangular structure is formed between the composite crossarm and the tower body, which can greatly improve the stability of the composite crossarm. On the other hand, the angle between the two post insulators ranges from 20° to 50°, and the angle between the post insulator and the suspension insulator adjacent thereto ranges from 15° to 45°, which can not only meet stress requirements of the composite crossarm, but also provide favorable conditions for mounting the first grading ring on the post insulator and mounting the second grading ring on the suspension insulator.

The post insulator includes an insulating body and a shed cladding a periphery of the insulating body, wherein the insulating body is a solid insulating core, or the insulating body is a hollow insulating tube, an insulating gas is sealed in the hollow insulating tube, and an absolute pressure value of the insulating gas ranges from 0.1 MPa to 0.15 MPa.

The insulating body is set as a hollow insulating tube, and the insulating gas with an absolute pressure value ranging from 0.1 MPa to 0.15 MPa, which can prevent daily maintenance and monitoring of the post insulator.

The shed includes a plurality of identical shed bodies spaced, the shed bodies being radially symmetric with respect to the insulating body.

The arrangement that the shed bodies are radially symmetric with respect to the insulating body is conducive to self-cleaning of the shed and enables the post insulator to have characteristics of pollution resistance, rain resistance and ice resistance.

The post insulator further includes a first link fitting, two ends of the post insulator are respectively connected to the first link fitting to mount the post insulator, and the first link fitting includes: a flange cylinder arranged in a hollow structure along an axial direction and sleeving an end portion of the insulating body; a flange plate capping one end of the flange cylinder away from the insulating body; a first connecting plate, in an axial direction of the post insulator, the first connecting plate extending outwards from one side of the flange plate away from the flange cylinder, and in a radial direction of the post insulator, the first connecting plate extending to two opposite sides of the flange cylinder to be connected to the flange cylinder; and a second connecting plate, a side edge of the second connecting plate abutting against a plate surface of the first connecting plate and extending from the first connecting plate to an outer peripheral surface of the flange cylinder, so that a mountable space is formed between the first connecting plate and the second connecting plate; wherein the two first connecting plates on the two ends of the post insulator are not arranged in parallel.

The two first connecting plates on the two ends of the post insulator are not arranged in parallel, so that the post insulator can be mounted and applied in different scenarios.

An inner wall of the flange cylinder is provided with a plurality of binding grooves spaced along the axial direction and a flow groove communicated with the plurality of binding grooves, wherein the binding grooves and the flow groove are filled with an adhesive to fixedly connect the flange cylinder and the insulating body.

The flow groove is arranged to be communicated with the binding grooves, which can increase a glue injection rate and can improve torsion resistance of the composite crossarm without replacing an adhesive with better bonding performance.

A plurality of flow grooves are provided, and the plurality of flow grooves are spaced along a circumferential direction of the flange cylinder; or a bottom surface of the flow groove is a plane or a curved surface.

When the bottom surface of the flow groove is set as a plane, torsional strength of the composite crossarm can be improved.

Widths of the plurality of binding grooves are equal, and the width of the binding groove is less than a width of an interval between two adjacent ones of the binding grooves; or the width of the binding groove is no more than 12 mm; or a ratio of a length of a contact portion between the inner wall of the flange cylinder and the insulating body to an outer diameter of the insulating body ranges from 0.8 to 1.2.

The width of the binding groove is set to be less than the width of the interval between two adjacent binding grooves, which can improve bending strength of the post insulator.

A plate surface of the flange plate facing the insulating body is provided with a first sealing groove facing an end surface of the insulating body, the first sealing groove being internally provided with a first sealing member; and the inner wall of the flange cylinder is provided with a second sealing groove adjacent to the flange plate, the second sealing groove and the plurality of binding grooves are sequentially spaced in a direction away from the flange plate, and the second sealing groove is internally provided with a second sealing member; wherein a width of the first sealing groove and/or the second sealing groove remains constant or gradually decreases in a direction close to the insulating body.

The arrangement of the second sealing groove and the second sealing member can prevent failure of the first sealing member caused by corrosion of the first sealing member by the adhesive entering the first sealing groove during binding. At the same time, the width of the second sealing groove gradually decreases in the direction close to the insulating body, which can prevent falloff of the second sealing member during mounting.

The insulating body is a hollow insulating tube, and a plate surface of the flange plate away from the insulating body is provided with a sink, the sink being internally provided with a self-sealing valve; and/or the insulating body is internally provided with a drying device, the drying device being mounted on a plate surface of the flange plate close to the insulating body.

The arrangement of the self-sealing valve, on the one hand, can realize extraction and filling of gas in the insulating body, and on the other hand, can realize sealing measurement and moisture numerical measurement before the product leaves the factory. The arrangement of the drying device can keep the interior of the insulating body dry.

The composite crossarm further includes an end fitting, the end fitting including: a connecting pillar, the connecting pillar being cylindrical; a post connecting plate, a side edge of the post connecting plate abutting against an outer peripheral surface of the connecting pillar, wherein the other ends of the two post insulators not connected to the tower body are spaced on the post connecting plate along an axial direction of the connecting pillar; a suspension connecting plate, two suspension connecting plates being provided, and the two suspension connecting plates being arranged on a same side of the post connecting plate and configured to respectively mount the other ends of the two suspension insulators not connected to the tower body; and a line hanging plate located on the other side of the post connecting plate away from the suspension connecting plate and extending along the outer peripheral surface of the connecting pillar to present a semi-enclosed structure, and configured to hang the power transmission line.

The arrangement of the end fitting can ensure strength of a connection between the post insulator and the suspension insulator.

The suspension connecting plate is provided with a through hole, a metal piece is inserted into the through hole, and the metal piece is arranged in a hollow structure along an axial direction and configured to allow a locking member to pass through to mount the suspension insulator on the suspension connecting plate.

The arrangement of the metal piece can increase connection strength of the suspension connecting plate and prevent crack of the suspension connecting plate under long-term stress.

The composite crossarm further includes a second link fitting configured to connect the tower body and the suspension insulator, the second link fitting including: a first sub-link fitting connected to the suspension insulator; and a second sub-link fitting having one end adjustably connected to the first sub-link fitting and the other end configured to connect the tower body, so as to realize a connection between the suspension insulator and the tower body.

The arrangement of the second link fitting enables the composite crossarm to be structurally variable and to be suitable for different application scenarios.

The first sub-link fitting is provided with a plurality of mounting portions arranged in an arc shape, and the second sub-link fitting is selectively connected to one of the mounting portions.

The arrangement of the mounting portions can make a distance between the suspension insulator and the tower body adjustable.

In order to solve the above technical problem, another technical solution adopted in the present disclosure is as follows. A power transmission tower is provided, wherein the power transmission tower includes a tower body and the composite crossarm described above and connected to the tower body.

The present disclosure has the following beneficial effects. In the composite crossarm according to the present disclosure, on the one hand, the two post insulators and the two suspension insulators are provided and connected together, so that a stable triangular structure is formed between the composite crossarm and the tower body, which can greatly improve the stability of the composite crossarm. On the other hand, the angle between the two post insulators ranges from 20° to 50°, and the angle between the post insulator and the suspension insulator adjacent thereto ranges from 15° to 45°, which can not only meet stress requirements of the composite crossarm, but also optimize a length of the composite crossarm and a width of the tower body, and provide favorable conditions for mounting the first grading ring on the post insulator and mounting the second grading ring on the suspension insulator.

At the same time, in the present disclosure, the inner wall of the flange cylinder is further provided with the flow groove communicated with two adjacent binding grooves, which can increase the glue injection rate and reduce a risk of bubble retention, so that the first link fitting is more firmly bound to the insulating body, so as to improve the torsion resistance of the composite crossarm without replacing the adhesive with better bonding performance.

In addition, in the present disclosure, the inner wall of the flange cylinder is further provided with the second sealing groove and the second sealing member, which can prevent failure of the first sealing member caused by corrosion of the first sealing member by the adhesive entering the first sealing groove during binding.

BRIEF DESCRIPTION OF THE DRAWINGS

In order to more clearly illustrate the technical solutions in embodiments of the present disclosure, the accompanying drawings to be used in the description of the embodiments will be briefly introduced below. It is apparent that, the accompanying drawings in the following description are only some embodiments of the present disclosure, and other drawings can be obtained by those of ordinary skill in the art from the provided drawings without creative efforts. In the drawings.

DETAILED DESCRIPTION OF THE EMBODIMENTS

Figure 1:
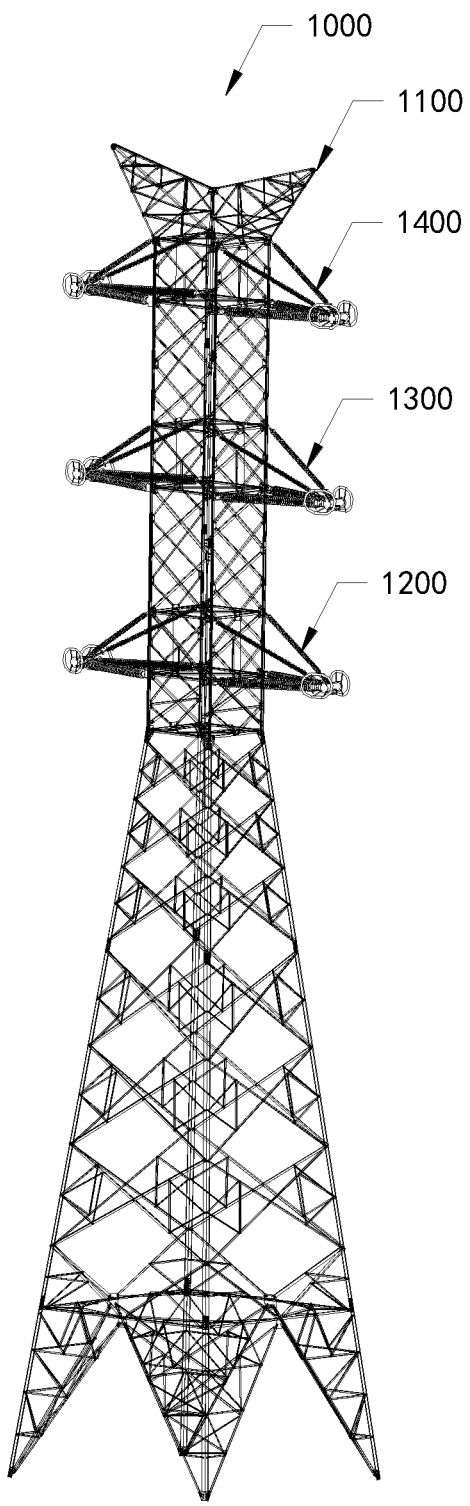
FIG. 1 is a schematic structural diagram of an implementation of a power transmission tower.

The technical solutions in embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those skilled in the art without creative efforts based on the embodiments of the present disclosure shall fall within the protection scope of the present disclosure.

Referring to FIG. 1 to FIG. 5, a power transmission tower 1000 includes a tower body 1100 and a composite crossarm 1200 connected to the tower body 1100. At the same time, the composite crossarm 1200 includes a post insulator 1210 and a suspension insulator 1220.

Two post insulators 1210 and two suspension insulators 1220 are provided. Of the two post insulators 1210 and the two suspension insulators 1220, one ends are connected to the tower body 1100 of the power transmission tower 1000, and the other ends are connected together to form an end portion of the composite crossarm 1200 to hang a power transmission line. The two suspension insulators 1220 are located on a same side of the two post insulators 1210 and respectively arranged adjacent to the two post insulators 1210, and at the same time, an angle between the two post insulators 1210 ranges from 20° to 50°, for example, 20°, 30°, 40°, 45° or 50°, and an angle between the post insulator 1210 and the suspension insulator 1220 adjacent thereto ranges from 15° to 45°, for example, 15°, 30° or 45°.

Specifically, the tower body 1100 may be of a common structure such as a lattice tower, a steel-pipe pole or a composite tower. In this implementation, the tower body 1100 is a lattice tower, and only a partial structure thereof is shown in the drawings.

At the same time, the arrangement of the two post insulators 1210 and the two suspension insulators 1220 enables a stable triangular structure to be formed between the composite crossarm 1200 and the tower body 1100, which can greatly improve the stability of the composite crossarm 1200.

In addition, the larger the angle between the two post insulators 1210 is, the greater the mechanical strength that the composite crossarm 1200 can bear, but a length of the composite crossarm 1200 and a width of the tower body 1100 are also required to be increased accordingly. Therefore, in consideration of the fact, the angle between the two post insulators 1210 is controlled to range from 20° to 50°, which not only meets stress requirements of the composite crossarm 1200, but also optimizes the length of the composite crossarm 1200 and the width of the tower body 1100. Similarly, the same objective can also be achieved by controlling the angle between the post insulator 1210 and the suspension insulator 1220 adjacent thereto to range from 15° to 45°.

Figure 2:
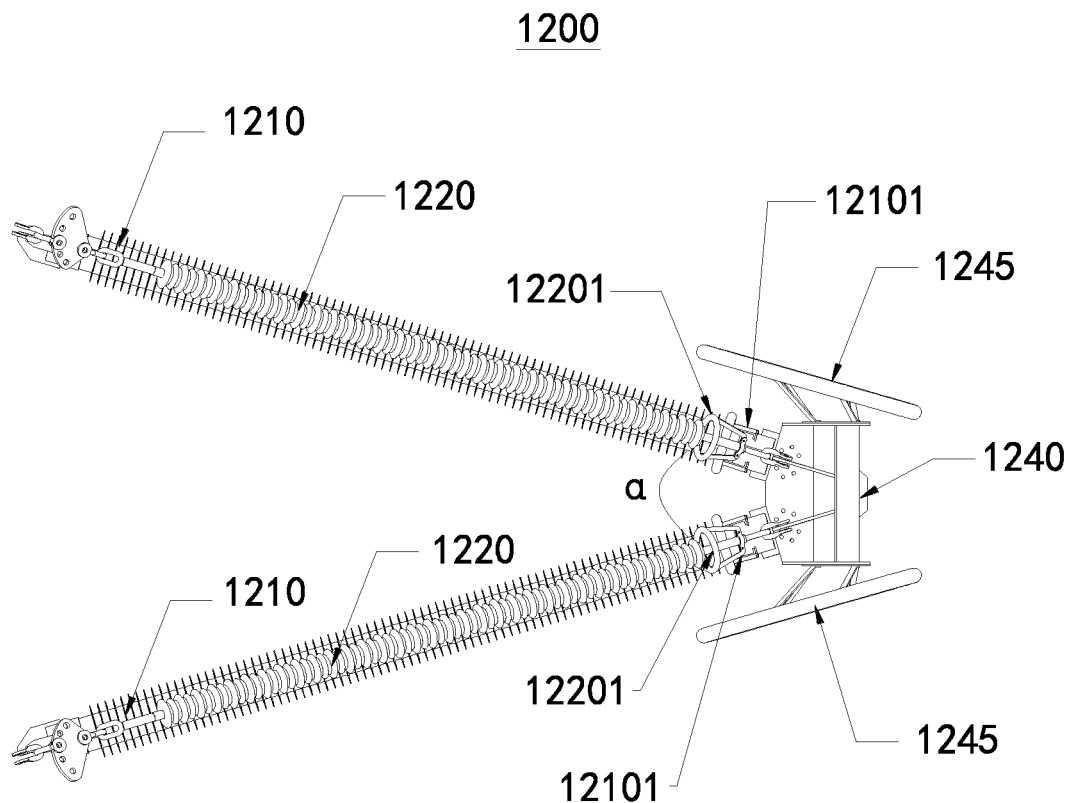
FIG. 2 is a schematic structural diagram of a composite crossarm in FIG. 1.

Specifically, as shown in FIG. 1, the tower body 1100 is sequentially provided with three composite crossarms from bottom to top, which are specifically a composite crossarm 1200, a composite crossarm 1300 and a composite crossarm 1400. Lengths of the composite crossarm 1200, the composite crossarm 1300 and the composite crossarm 1400 extending out of the tower body 1100 decrease or increase successively or are in other forms. That is, in a vertical direction of the power transmission tower 1000, lengths of the post insulators decrease or increase successively or are in other forms from bottom to top, and the larger the length of the post insulator, the smaller the angle between the two post insulators of the composite crossarm. Referring to FIG. 2, assuming that the angle between the two post insulators 1210 is α, the lengths of the two post insulators 1210 are both L, and a width of the tower body 1100 perpendicular to an axis of symmetry of the two post insulators 1210 in a horizontal direction is D, $$\sin\frac{\alpha}{2} = \frac{D}{2L}$$

may be obtained from a trigonometric formula.

In an application scenario, by taking the power transmission tower 1000 of 500 kV as an example, L ranges from 4000 mm to 8000 mm, and D ranges from 2500 mm to 3500 mm, from which it may be calculated that a minimum value of α is 18° and a maximum value of α is 51.8°. Therefore, the angle between the two post insulators 1210 may be controlled to range from 20° to 50°.

Figure 3:
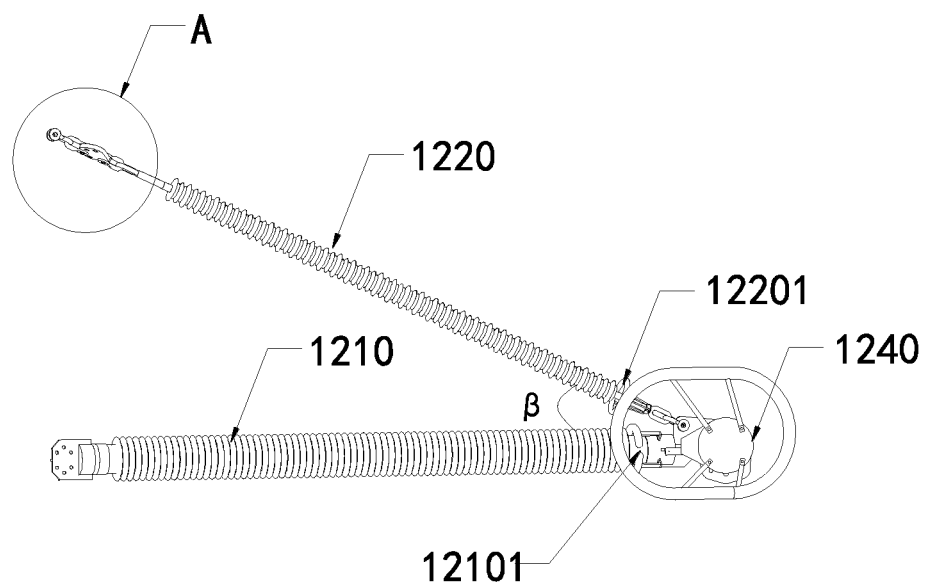
FIG. 3 is a partial schematic structural diagram of the composite crossarm in FIG. 2.

Similarly, referring to FIG. 3, assuming that the angle between the post insulator 1210 and the suspension insulator 1220 adjacent thereto is β, and also assuming that a distance between a connection point of the post insulator 1210 on the tower body 1100 and a connection point of the suspension insulator 1220 adjacent thereto on the tower body 1100 is H, $$\tan \beta = 2 \frac{H \tan\frac{\alpha}{2}}{D}$$

may be obtained from a trigonometric formula.

By taking the power transmission tower 1000 of 500 kV as an example, H is generally set to 2500 mm, from which it may be calculated that a minimum value of β is 14.2° and a maximum value of β is 43°. Since H is resized, the angle between the post insulator 1210 and the suspension insulator 1220 adjacent thereto may be controlled to range from 15° to 45°.

At the same time, the arrangement that the angle between the two post insulators 1210 ranges from 20° to 50° may also provide favorable conditions for arranging a first grading ring 12101 on a high-voltage end of the post insulator 1210 (one end away from the tower body 1100) and arranging an end fitting 1240 (introduced in detail below) to be connected to the post insulator 1210 and the suspension insulator 1220. Specifically, this can ensure that the first grading rings 12101 on the two post insulators 1210 do not interfere with each other and the first grading ring 12101 does not interfere with a shed 1212 (introduced in detail below) of the post insulator 1210 and the end fitting 1240.

The arrangement that the angle between the post insulator 1210 and the suspension insulator 1220 adjacent thereto ranges from 15° to 45° may provide favorable conditions for arranging the first grading ring 12101 on the high-voltage end of the post insulator 1210 and arranging a second grading ring 12201 on a high-voltage end of the suspension insulator 1220 (one end away from the tower body 1100). Specifically, this can ensure that the first grading ring 12101 and the second grading ring 12201 do not interfere with each other when misaligned.

Still referring to FIG. 1 and FIG. 2, in this implementation, the two post insulators 1210 are mounted at a same height, the two suspension insulators 1220 are mounted at a same height, and at the same time, the two suspension insulators 1220 are both located above or below the two post insulators 1210 (the two suspension insulators 1220 being both located above the two post insulators 1210 is illustrated in the figures). When the two suspension insulators 1220 are both located above the two post insulators 1210, the two suspension insulators 1220 may play a role of tensile support, preventing the influence on the long-term service life of the post insulator 1210 caused by downward bending of the end portion of the post insulator 1210 away from the power transmission tower 1000 after the power transmission line is hung.

The two post insulators 1210 may be arranged horizontally (illustrated in FIG. 1) or obliquely.

At the same time, in this implementation, angles between the two post insulators 1210 and the suspension insulators 1220 adjacent thereto are equal. That is, the composite crossarm 1200 is of a symmetrical structure to ensure uniform force on the composite crossarm 1200. However, the present disclosure is not limited thereto. For example, in another implementation, an angle between one post insulator 1210 and the suspension insulator 1220 adjacent thereto is 20°, and an angle between the other post insulator 1210 and the suspension insulator 1220 adjacent thereto is 45°.

Structures of the composite crossarm 1300 and the composite crossarm 1400 are both similar to the structure of the composite crossarm 1200, and are not described in detail.

Figure 4:
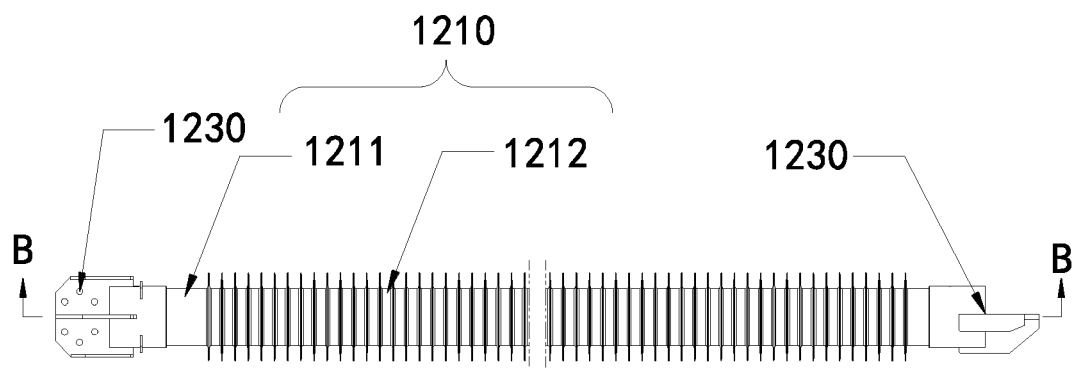
FIG. 4 is a schematic structural diagram when a post insulator and a first link fitting are connected in FIG. 2.
Figure 5:
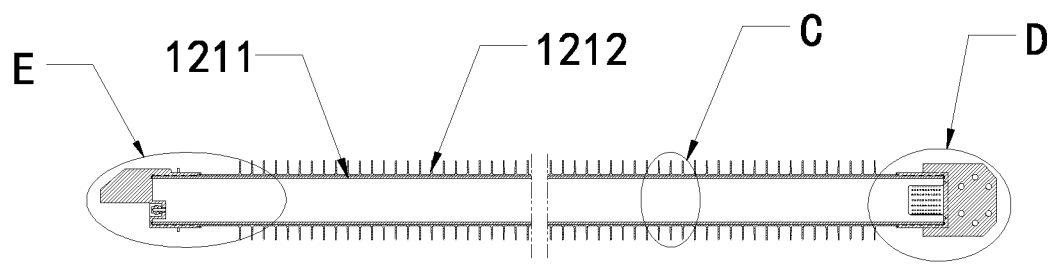
FIG. 5 is a schematic cross-sectional view of the structure in FIG. 4 taken along a section B-B.

Referring to FIG. 4 and FIG. 5, in this implementation, the post insulator 1210 includes an insulating body 1211 and a shed 1212 cladding a periphery of the insulating body 1211.

Specifically, the insulating body 1211 may be a solid insulating core or a hollow insulating tube. When the insulating body 1211 is a solid insulating core, it may be a glass fiber or aramid fiber impregnated epoxy resin wound or pultruded or pultruded and wound solid core. When the insulating body 1211 is a hollow insulating tube, it may be a glass fiber or aramid fiber impregnated epoxy resin pultruded and wound hollow pultrusion tube, or a glass fiber impregnated epoxy resin wound and cured or pultruded glass steel tube, or an aramid fiber impregnated epoxy resin wound and cured aramid fiber tube, which is not limited herein.

The insulating body 1211 may be cylindrical (illustrated in the drawings), conical or of other shapes (such as a drum), which is not limited herein. When the insulating body 1211 is conical, it has a cone end (one end with a smaller diameter) connected to the end fitting 1240, and the other end connected to the tower body 1100, so that the post insulator 1210 can withstand greater power transmission line pressure.

In an application scenario, when the insulating body 1211 is a hollow insulating tube, an insulating gas is sealed in the insulating body 1211, and an absolute pressure value of the insulating gas ranges from 0.1 MPa to 0.15 MPa, for example, 0.1 Mpa, 0.12 Mpa or 0.15 Mpa.

Specifically, the gas sealed in the hollow insulating tube may be high-purity nitrogen, air or sulfur hexafluoride after drying, which is not limited herein.

At the same time, the arrangement that the absolute pressure value of the insulating gas ranges from 0.1 MPa to 0.15 MPa may make it difficult for the insulating gas to leak from the hollow insulating tube, prevent routine maintenance and monitoring of the post insulator 1210, and also meet usage requirements of different pressures in different regions and altitudes, so as to ensure that gases inside the hollow insulating tube are in a non-negative pressure state when the hollow insulating tube is used in different regions and also enable the hollow insulating tube to have a large margin of moisture control, thereby effectively reducing the difficulty of moisture control.

In other application scenarios, when the insulating body 1211 is the hollow insulating tube, inert gas or solid materials such as polyurethane and liquid silicone rubber may also be sealed therein, which is not limited herein.

At the same time, the shed 1212 may be made of a material such as high-temperature vulcanized silicone rubber, liquid silicone rubber or room temperature vulcanized silicone rubber, which is not limited herein.

Figure 6:
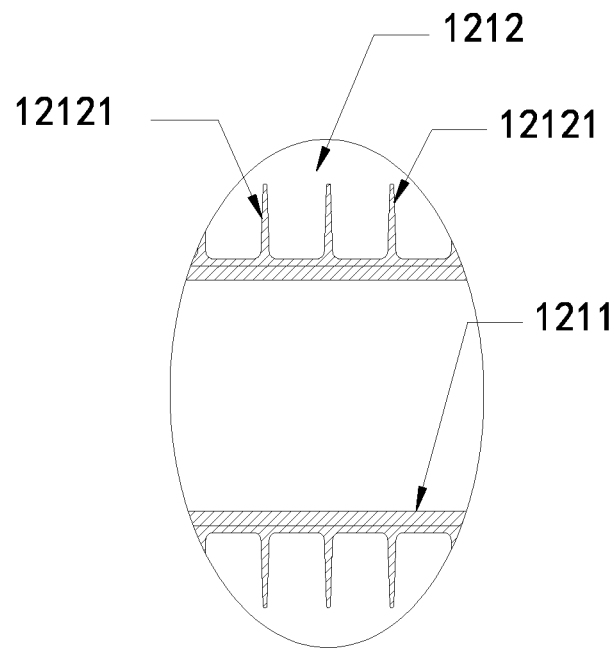
FIG. 6 is a schematic enlarged view of C in FIG. 5.

Referring to FIG. 5 and FIG. 6, in this implementation, the shed 1212 includes a plurality of identical shed bodies 12121 spaced. That is, all the shed bodies 12121 are identical. At the same time, the shed bodies 12121 are radially symmetric with respect to the insulating body 1211. That is, two opposite surfaces of the shed body 12121 have opposite inclination directions and same inclination angles. Specifically, the shed bodies 12121 are arranged to be radially symmetric with respect to the insulating body 1211, which, on the one hand, with respect to the fact in the prior art that the two opposite surfaces of the shed body 12121 tilt in a same direction, enables rainwater to flow down along the shed 1212 (due to the horizontal arrangement of the post insulator 1210, the rainwater tends to accumulate in an angle between the insulating body 1211 and the shed body 12121 if the two surfaces of the shed body 12121 arranged oppositely tilt in a same direction), so as not to form a water film on a surface of the shed 1212, thereby not being conducive to self-cleaning of the shed 1212, and on the other hand, enables two opposite sides of the shed body 12121 to have same mechanical properties, so that the post insulator 1210 has characteristics of pollution resistance, rain resistance, ice resistance and being more economical.

In an application scenario, in order to prevent the formation of turbulence and fouling between two adjacent shed bodies 12121 which will cause bridging, a spacing between the two adjacent shed bodies 12121 is greater than 40 mm and less than 60 mm, for example, 45 mm, 50 mm or 60 mm. Certainly, the spacing between two adjacent shed bodies 12121 should be reduced as far as possible, so as to increase distribution density of the shed bodies 12121 and make it difficult for birds to stand on a sheath, thereby preventing the occurrence of bird damage accidents. At the same time, under a requirement of a minimum creepage distance, a height of one side of the shed body 12121 protruding beyond the insulating body 1211 is no more than 80 mm, which generally ranges from 50 mm to 80 mm, for example, 50 mm, 60 mm, 70 mm or the like.

It is to be noted that, in other implementations, the shed 1212 may also be of other structures. For example, two adjacent shed bodies 12121 are of different sizes, or two opposite surfaces of the shed body 12121 tilt in a same direction. To sum up, the specific structure of the shed 1212 is not limited in the present disclosure.

Figure 7:
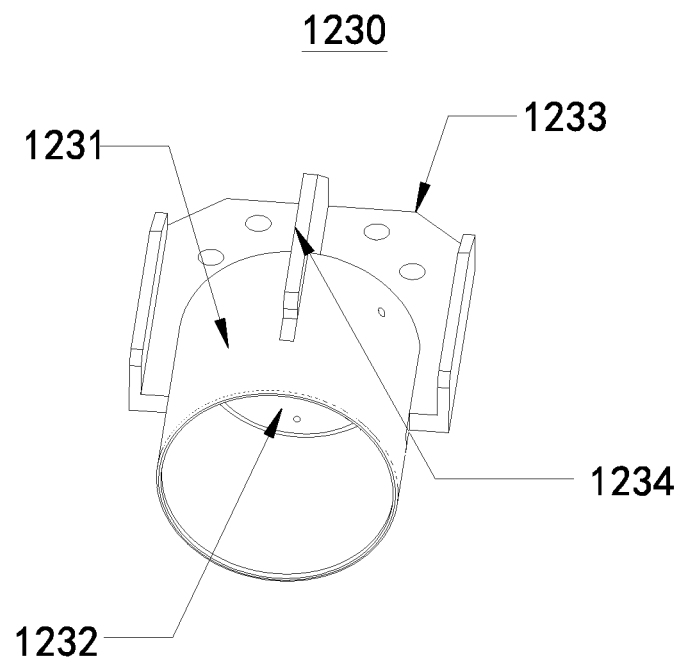
FIG. 7 is a schematic structural diagram of the first link fitting in FIG. 4.
Figure 8:
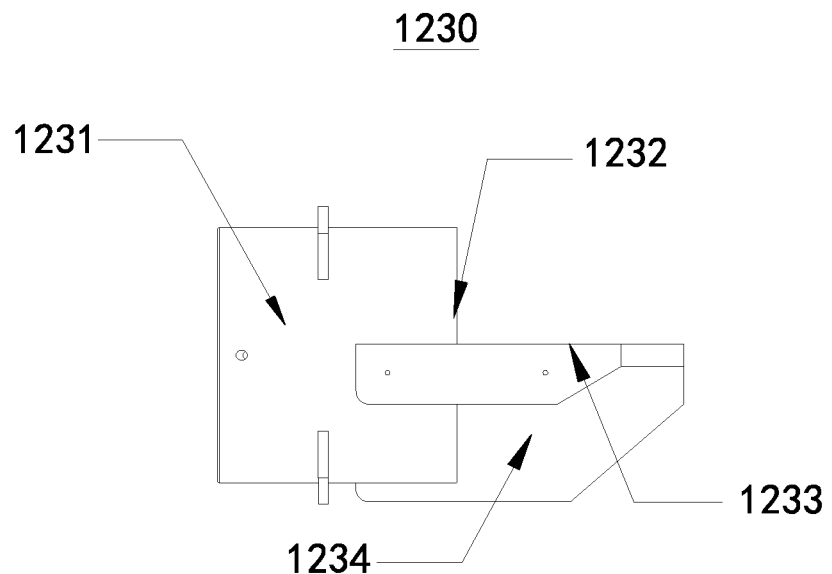
FIG. 8 is a schematic diagram when the first link fitting in FIG. 7 is at another angle.
Figure 9:
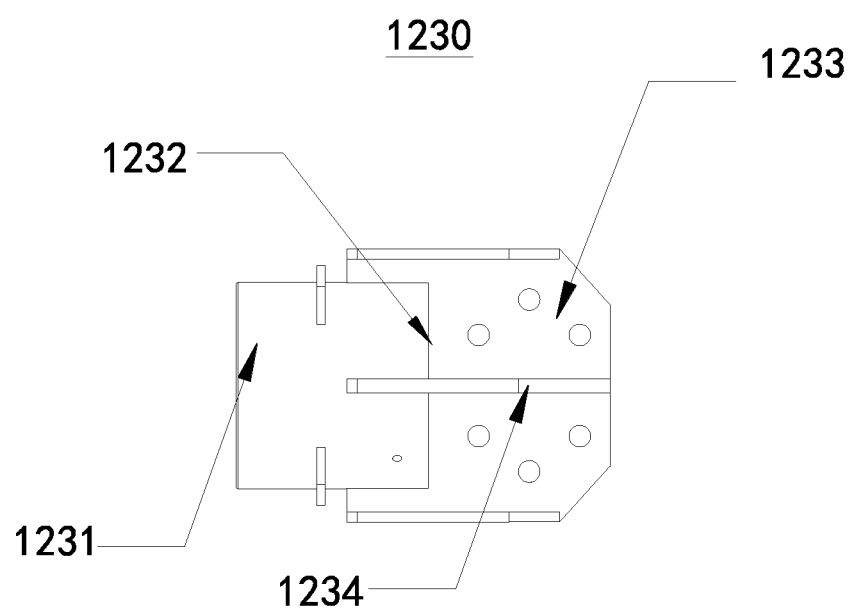
FIG. 9 is a schematic diagram when the first link fitting in FIG. 7 is at another angle.

Still referring to FIG. 4, in this implementation, the post insulator 1210 further includes a first link fitting 1230, and two ends of the post insulator 1210 are respectively connected to the first link fitting 1230 to mount the post insulator 1210. That is, one first link fitting 1230 connected to one end of the post insulator 1210 is configured to connect the post insulator 1210 with the tower body 1100, and another first link fitting 1230 connected to the other end of the post insulator 1210 is configured to connect the post insulator 1210 with the suspension insulator 1220. At the same time, referring to FIG. 7, FIG. 8 and FIG. 9, the first link fitting 1230 includes: a flange cylinder 1231, a flange plate 1232, a first connecting plate 1233 and a second connecting plate 1234.

The flange cylinder 1231 is arranged in a hollow structure along an axial direction and sleeves an end portion of the insulating body 1211. The flange plate 1232 caps one end of the flange cylinder 1231 away from the insulating body 1211. The flange cylinder 1231 and the flange plate 1232 may be formed integrally or formed separately and joined together by welding or the like. The first connecting plate 1233 extends from one side of the flange plate 1232 away from the flange cylinder 1231 to two opposite sides of the flange cylinder 1231 to be connected to the flange cylinder 1231. That is, in an axial direction of the post insulator 1210, the first connecting plate 1233 extends outwards from one side of the flange plate 1232 away from the flange cylinder 1231, and in a radial direction of the post insulator 1210, the first connecting plate 1233 extends to two opposite sides of the flange cylinder 1231 to be connected to the flange cylinder 1231. A side edge of the second connecting plate 1234 abuts against a plate surface of the first connecting plate 1233 and extends from the first connecting plate 1233 to an outer peripheral surface of the flange cylinder 1231, so that a mountable space is formed between the first connecting plate 1233 and the second connecting plate 1234. The mountable space may be configured to place a locking member (such as a bolt) that locks the post insulator 1210 with the tower body 1100 or the suspension insulator 1220. Understandably, the arrangement of the second connecting plate 1234 can indirectly increase an area of contact between the first connecting plate 1233 and the flange cylinder 1231, so as to improve strength of the first link fitting 1230.

Specifically, the arrangement that the flange plate 1232 caps one end of the flange cylinder 1231 away from the insulating body 1211 may prevent the corrosion of the insulating body 1211 by external water vapor, protect the insulating body 1211, and prolong a service life of the post insulator 1210. At the same time, the arrangement of the first connecting plate 1233 and the second connecting plate 1234 may improve the strength of the first link fitting 1230 and then improve the strength of the post insulator 1210.

At the same time, in order to enable the post insulator 1210 to be mounted and applied in different scenarios, the two first connecting plates 1233 at two ends of the post insulator 1210 are not arranged in parallel. A relative angle of the two connecting plates 1233 not arranged in parallel is determined according to an actual situation such as a connection structure on the tower body 1100 and a connection structure on the suspension insulator 1220, which is not limited herein. In one embodiment, the two connecting plates 1233 are arranged vertically. That is, a relative angle of the two connecting plates 1233 is 90°.

In order to prevent corrosion of the first link fitting 1230 by water vapor and the like, the surface of the first link fitting 1230 is hot-dip galvanized, and an internal material of the first link fitting 1230 may be cast aluminum, cast iron or alloy steel, which is not limited herein.

At the same time, various parts of the first link fitting 1230 may be connected by welding or the like.

Figure 10:
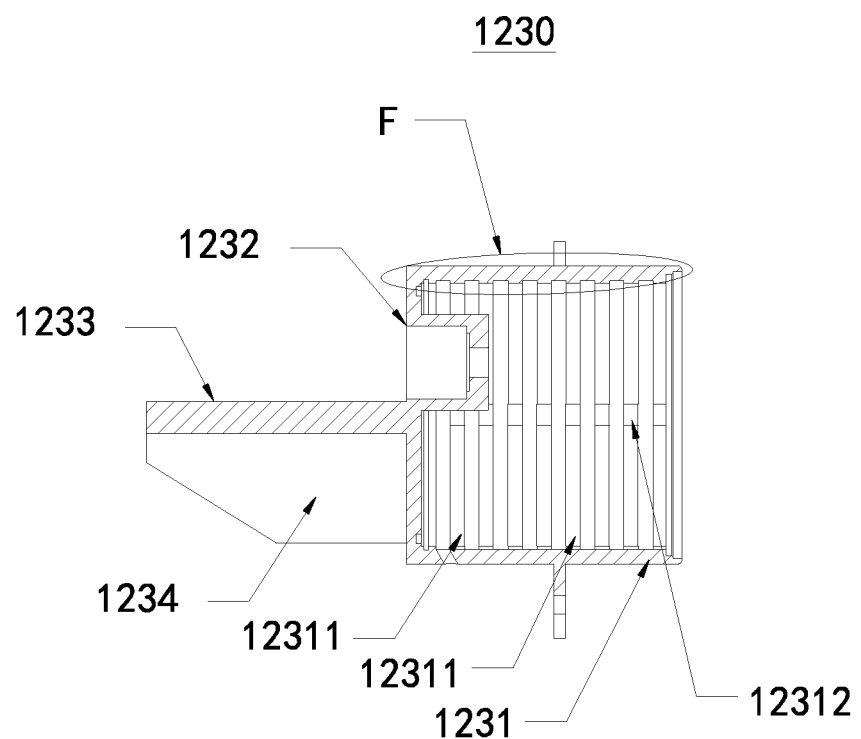
FIG. 10 is a schematic cross-sectional view of the first link fitting in FIG. 7.

Referring to FIG. 4 and FIG. 10, in this implementation, an inner wall of the flange cylinder 1231 is provided with a plurality of binding grooves 12311 spaced along the axial direction and a flow groove 12312 connected to the plurality of binding grooves 12311, wherein the binding grooves 12311 and the flow groove 12312 are filled with an adhesive to fixedly connect the flange cylinder 1231 and the insulating body 1211.

Specifically, during production, the first link fitting 1230 and the insulating body 1211 are connected together by a horizontal or vertical binding process. During the production, firstly, the adhesive is injected between the flange cylinder 1231 and the insulating body 1211 through a glue injection hole, and then, after a certain period of high-temperature curing, the first link fitting 1230 and the insulating body 1211 may be fixed together.

The flow groove 12312 is arranged along an axial direction of the flange cylinder 1231, and the arrangement of the flow groove 12312 enables the adhesive injected between the flange cylinder 1231 and the insulating body 1211 to flow between adjacent binding grooves 12311, which can increase a glue injection rate and reduce a risk of bubble retention, so that the first link fitting 1230 is more firmly bound to the insulating body 1211, so as to improve the torsion resistance of the composite crossarm 1200 without replacing the adhesive with better bonding performance.

One or more (e.g., two, four, six or even more) flow grooves 12312 may be provided. Moreover, when a plurality of flow grooves 12312 are provided, the plurality of flow grooves 12312 are spaced along a circumferential direction of the flange cylinder 1231. One flow groove 12312 may be communicated with only two adjacent binding grooves 12311 or communicated with three or four adjacent or even all binding grooves 12311, which is not limited herein.

A bottom surface of the flow groove 12312 is a plane or a curved surface. Specifically, when a radial depth and a width of the flow groove 12312 are constant relative to the first link fitting 1230, the flow groove 12312 of which the bottom surface is a plane has higher processing complexity and processing costs, but higher torsional strength than the flow groove 12312 of which the bottom surface is a curved surface. This is due to a greater contact area between the adhesive in the plane groove and the inner wall of the flange cylinder 1231. That is, the flow groove 12312 of which the bottom surface is a curved surface is easier to process and has lower processing costs but lower torsional strength than the flow groove 12312 of which the bottom surface is a plane.

Figure 11:
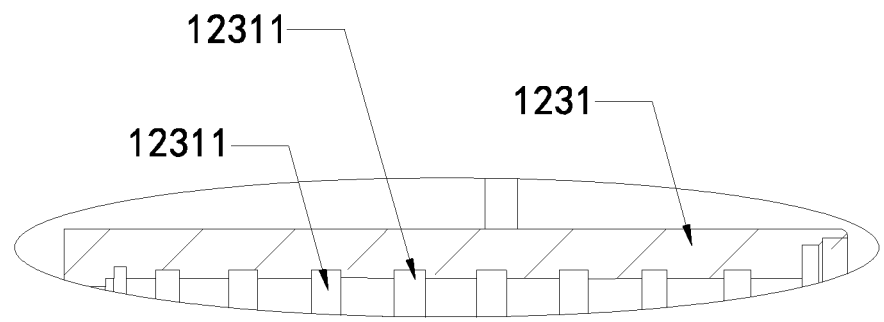
FIG. 11 is a schematic enlarged view of F in FIG. 10.
Figure 12:
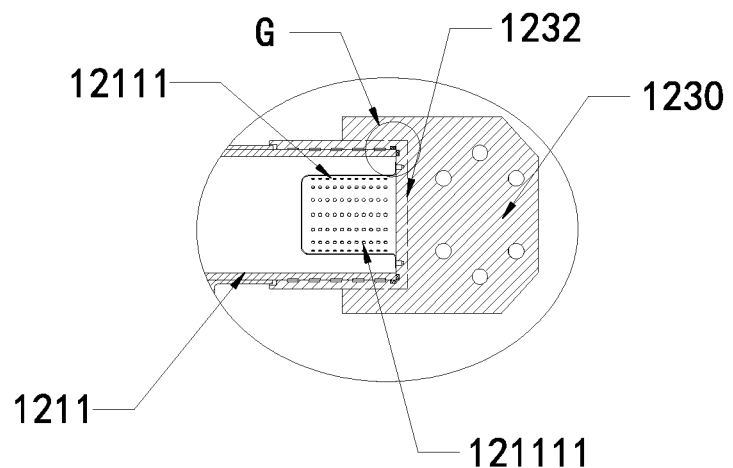
FIG. 12 is a schematic enlarged view of D in FIG. 5.
Figure 13:
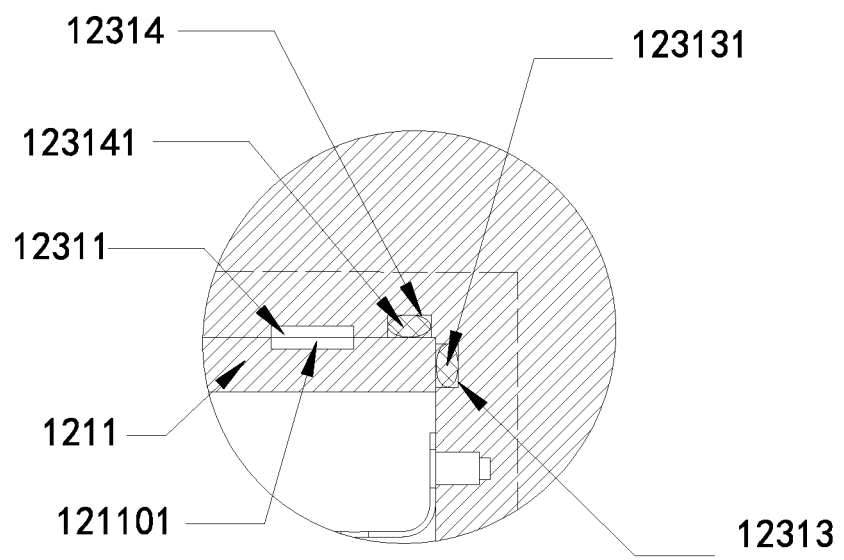
FIG. 13 is a schematic enlarged view of FIG. 12 at G in an application scenario.

Referring to FIG. 10 and FIG. 11, in the axial direction of the flange cylinder 1231, widths of the plurality of binding grooves 12311 are equal, and the width of the binding groove 12311 is less than a width of an interval between two adjacent binding grooves 12311. Specifically, the arrangement that the width of the binding groove 12311 is less than the width of the interval between two adjacent binding grooves 12311 enables a width of a binding mating groove 121101 on the insulating body 1211 (as shown in FIG. 12 and FIG. 13, the binding mating groove 121101 on the insulating body 1211 has a same specification as and is arranged directly opposite to the binding groove 12311 on the flange cylinder 1231) to be also less than the width of an interval between two adjacent binding mating grooves 121101. The arrangement can ensure shear resistance of the post insulator 1210 compared with the width of the binding mating groove 121101 being greater than or equal to the width of the interval between two adjacent binding mating grooves 121101.

The width of the binding groove 12311 is no more than 12 mm. Specifically, axial shear strength of the insulating body 1211 is relatively low. When it is damaged, a part arranged in the flange cylinder 1231 without adhesive bonding is first damaged, that is, the part of the insulating body 1211 located between two adjacent binding mating grooves 121101. When a width of the flange cylinder 1231 along its axial direction is constant, if the width of the binding groove 12311 decreases, the distance between two adjacent binding grooves 12311 may increase. That is, the distance between two adjacent binding mating grooves 121101 on the insulating body 1211 may increase, and its shear failure strength may be improved. Finally, the shear resistance of the post insulator 1210 with the same specification may be enhanced. However, if the width of the binding groove 12311 is too small, processing time and processing costs may increase. Therefore, the arrangement that the width of the binding groove 12311 is no more than 12 mm, such as 12 mm, 10 mm or 8 mm, can ensure the strength of the composite crossarm 1200 and can also ensure that the processing time and the processing costs are within a reasonable range.

In order to facilitate processing, the bottom surface of the binding groove 12311 is a curved surface.

A ratio (i.e., binding ratio) of a length of a contact portion between the inner wall of the flange cylinder 1231 and the insulating body 1211 to an outer diameter of the insulating body 1211 ranges from 0.8 to 1.2, for example, 0.8, 1.0 or 1.2. Specifically, with the reduction of the binding ratio, the strength of the composite crossarm 1200 may significantly decrease. For example, compared with the binding ratio of 0.8, the strength of the composite crossarm 1200 may decrease by 20% when the binding ratio decreases to 0.75; and compared with the binding ratio of 1.2, the strength of the composite crossarm 1200 may increase slightly but the costs increase significantly when the binding ratio increases to 1.4. Therefore, the binding ratio ranging from 0.8 to 1.2 enables the composite crossarm 1200 to have advantages of low costs and high strength.

At the same time, it is also to be noted that, in other implementations, the binding groove 12311 and the flow groove 12312 may also be of other sizes, which is not limited herein.

In an application scenario, referring to FIG. 12 and FIG. 13, a plate surface of the flange plate 1232 facing the insulating body 1211 is provided with a first sealing groove 12313 facing an end surface of the insulating body 1211, and the first sealing groove 12313 is internally provided with a first sealing member 123131. Specifically, the first sealing member 123131 is arranged in the first sealing groove 12313 to prevent entry of external water vapor or adhesive into the insulating body 1211 to avoid leakage of gas in the insulating body 1211, and to prevent entry of the external water vapor or adhesive into the flange plate 1232 to affect the sealing between the insulating body 1211 and the first link fitting 1230.

Still referring to FIG. 12 and FIG. 13, the inner wall of the flange cylinder 1231 is further provided with a second sealing groove 12314 adjacent to the flange plate 1232, the second sealing groove 12314 and the plurality of binding grooves 12311 are sequentially spaced in a direction away from the flange plate 1232, and the second sealing groove 12314 is internally provided with a second sealing member 123141. Specifically, the second sealing member 123141 and the first sealing member 123131 act differently. The second sealing member 123141 is configured to prevent failure of the first sealing member 123131 caused by corrosion of the first sealing member 123131 by the adhesive entering the first sealing groove 12313 during binding.

Figure 14:
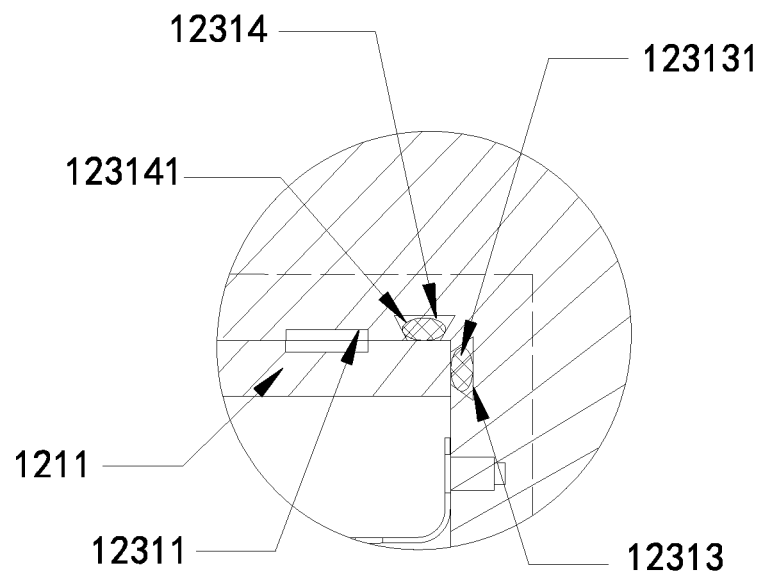
FIG. 14 is a schematic enlarged view of FIG. 12 at G in another application scenario.

A width of the first sealing groove 12313 and/or the second sealing groove 12314 remains constant (as shown in FIG. 13) or gradually decreases (as shown in FIG. 14) in a direction close to the insulating body 1211. Specifically, the first sealing groove 12313 whose width remains constant in the direction close to the insulating body 1211 is easy to process, but the first sealing member 123131 therein is prone to sliding or even falling. In this case, in order to prevent relative sliding of the first sealing member 123131 in the first sealing groove 12313, the first sealing member 123131 is fixed in the first sealing groove 12313 by resin or silica gel bonding. Compared with the first sealing groove 12313 whose width remains constant in the direction close to the insulating body 1211, the first sealing groove 12313 whose width gradually decreases in the direction close to the insulating body 1211 is more complicated in processing but can ensure that the first sealing member 123131 may not fall easily. The width of the first sealing groove 12313 and/or the second sealing groove 12314 may decrease linearly (as shown in FIG. 14) or curve down in the direction close to the insulating body 1211, which is not limited herein.

Figure 15:
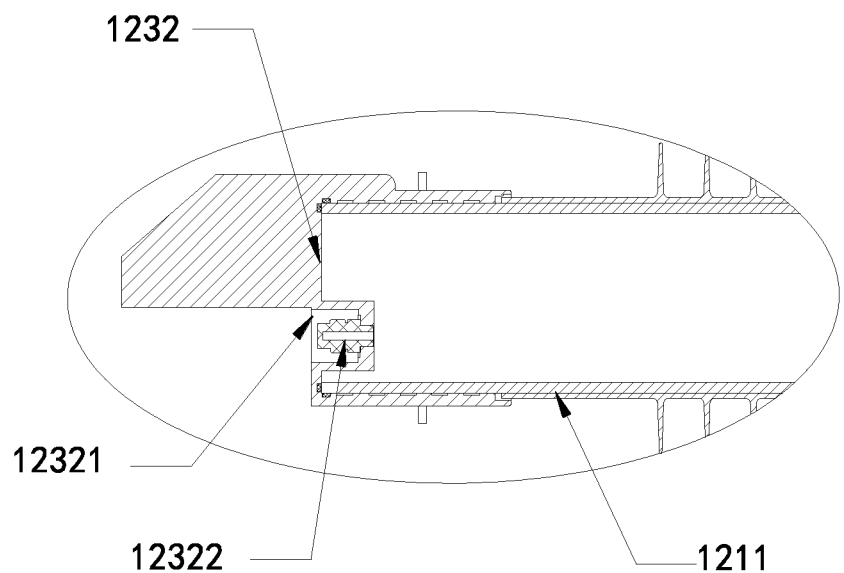
FIG. 15 is a schematic enlarged view of E in FIG. 5.

In an application scenario, referring to FIG. 5, FIG. 12 and FIG. 15, when the insulating body 1211 is a hollow insulating tube, a plate surface of the flange plate 1232 away from the insulating body 1211 is provided with a sink 12321. The sink 12321 is internally provided with a self-sealing valve 12322. Specifically, the self-sealing valve 12322, on the one hand, is configured for extraction and filling the gas in the insulating body 1211, and on the other hand, is configured for sealing measurement and moisture numerical measurement before the product leaves the factory (after the product passes testing, the self-sealing valve 12322 is required to be sealed with a material such as liquid silicone rubber or epoxy resin).

At the same time, when the insulating body 1211 is the hollow insulating tube, the insulating body 1211 is internally provided with a drying device 12111. The drying device 12111 is mounted on a plate surface of the flange plate 1232 close to the insulating body 1211. Specifically, the drying device 12111 is configured to keep the interior of the insulating body 1211 dry. As shown in FIG. 12, the drying device 12111 is cage-shaped and upside down on the flange plate 1232, and the drying device 12111 is provided with vias 121111 of a same size and evenly distributed to form a shielding cage, so as to make use of a principle of the shielding cage to ensure that the drying device 12111 may not affect an internal electric field of the insulating body 1211. At the same time, the drying device 12111 is internally provided with desiccant. The desiccant may be a molecular sieve desiccant or the like, which is not limited herein.

It is to be noted that the specific structure and number of the drying device 12111 are not limited in the present disclosure. The number of the drying device 12111 may be one, two or more.

It is to be noted that the flange plate 1232 of the first link fitting 1230 may be provided with both the self-sealing valve 12322 and the drying device 12111, and may also be provided with only one of the self-sealing valve 12322 and the drying device 12111 (for example, as can be seen from FIG. 5, FIG. 12 and FIG. 15, in the two flange plates 1232 on two ends of the post insulator 1210, one is provided with only the drying device 12111 and the other one is provided with only the self-sealing valve 12322).

Figure 16:
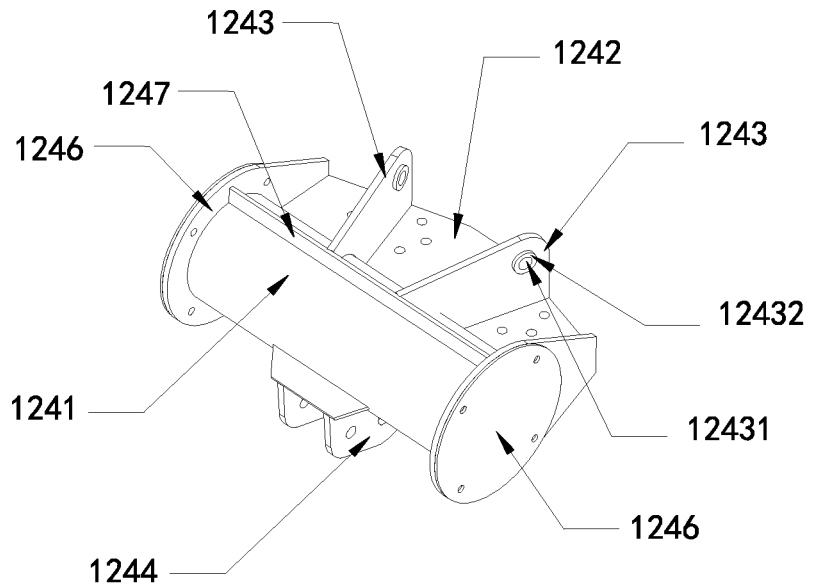
FIG. 16 is a schematic structural diagram of an end fitting in FIG. 2.
Figure 17:
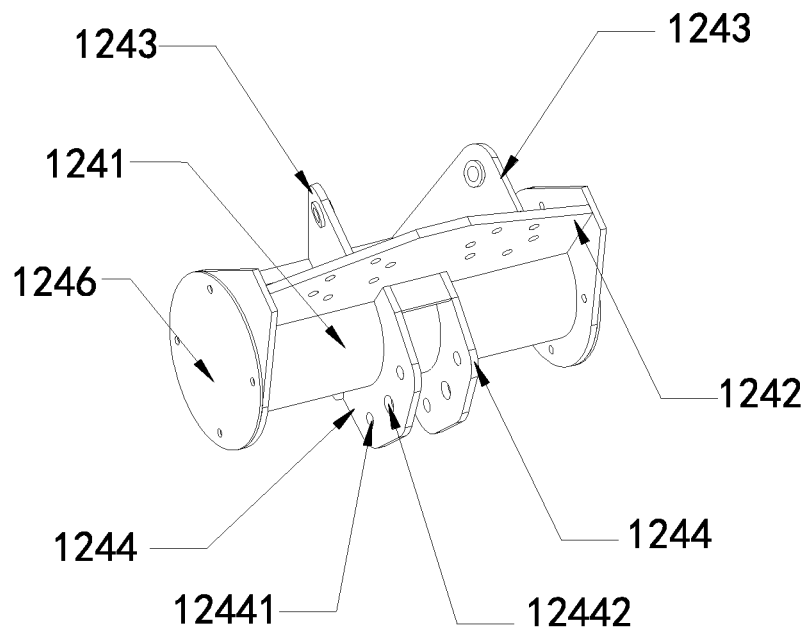
FIG. 17 is a schematic diagram when the end fitting in FIG. 16 is at another angle.

Referring to FIG. 2, FIG. 16 and FIG. 17, in this implementation, the composite crossarm 1200 further includes an end fitting 1240 configured to realize a connection between the post insulator 1210 and the suspension insulator 1220. The end fitting 1240 includes a connecting pillar 1241, a post connecting plate 1242, a suspension connecting plate 1243 and a line hanging plate 1244.

The connecting pillar 1241 is cylindrical. A side edge of the post connecting plate 1242 abuts against an outer peripheral surface of the connecting pillar 1241. The other ends of the two post insulators 1210 not connected to the tower body 1100 are spaced connected on the post connecting plate 1242 along an axial direction of the connecting pillar 1241 (the two post insulators 1210 are mounted on a same side or different sides of the post connecting plate 1242). Two suspension connecting plates 1243 are provided, and the two suspension connecting plates 1243 are arranged on a same side of the post connecting plate 1242, and a side edge on the suspension connecting plate 1243 adjacent to the end of the suspension connecting plate 1243 connected to the post connecting plate 1242 abuts against the outer peripheral surface of the connecting pillar 1241, and is configured to respectively mount the other ends of the two suspension insulators 1220 not connected to the tower body 1100. The line hanging plate 1244 is located on the other side of the post connecting plate 1242 away from the suspension connecting plate 1243 and extends along the outer peripheral surface of the connecting pillar 1241 to present a semi-enclosed structure, and configured to hang the power transmission line. The line hanging plate 1244 is provided with a line hanging portion 12441 configured to hang the power transmission line. The line hanging portion 12441 may specifically be a line hanging hole, and the number thereof may be one, two (as shown in FIG. 17) or more, which is not limited herein. It may be understood that at the same time, the line hanging plate 1244 is further provided with a construction hole 12442 for construction lifting. One or more construction holes 12442 may be provided, which is not limited herein.

Still referring to FIG. 17, two line hanging plates 1244 are provided. The two line hanging plates 1244 are spaced along an axial direction of the connecting pillar 1241, so that an intermediate connector (not shown) may be arranged in a space between the two line hanging plates 1244. The intermediate connector may be connected to the line hanging portions 12441 on the two line hanging plates 1244 through locking members (such as bolts), and then a line hanging fitting is hung on the intermediate connector to hang the power transmission line. That is, in this case, the two line hanging plates 1244 jointly bear the tension of the power transmission line, to prevent damages when one line hanging plate 1244 independently bears the tension of the power transmission line, thereby improving mechanical strength of the end fitting 1240 on the whole.

In an application scenario, the end fitting 1240 further includes a support plate 1246. The support plate 1246 caps an end surface of the connecting pillar 1241 and extends outwards from the connecting pillar 1241 to be connected to one side edge of the post connecting plate 1242. That is, the support plate 1246 is connected to the end surface of the connecting pillar 1241 and the one side edge of the post connecting plate 1242 at the same time. Moreover, two support plates 1246 are provided, respectively cap two end surfaces of the connecting pillar 1241 and are connected to two side edges of the post connecting plate 1242. On the one hand, the support plate 1246 may be used to cap the end surface of the connecting pillar 1241. On the other hand, the support plate 1246 connects the connecting pillar 1241 and the post connecting plate 1242 together, which can enhance the overall stability of the end fitting 1240.

In another application scenario, the end fitting 1240 further includes a reinforcing member 1247. The reinforcing member 1247 is arranged on the outer peripheral surface of the connecting pillar 1241 along the axial direction of the connecting pillar 1241. Specifically, the reinforcing member 1247 is a plate, and is connected to the suspension connecting plate 1243 and the support plate 1246 at the same time. That is, a plate surface of the reinforcing member 1247 is connected to the suspension connecting plate 1243, and two side edges of the reinforcing member 1247 are connected to a plate surface of the support plate 1246 close to the connecting pillar 1241, which further strengthens the overall stability and improves the mechanical strength of the end fitting 1240.

Similar to the first link fitting 1230, the surface of the end fitting 1240 is also hot-dip galvanized, an internal material thereof may also be cast aluminum, cast iron or alloy steel, and various parts of the first link fitting 1230 may also be connected by welding or the like.

In this implementation, referring to FIG. 2 and FIG. 16, two end portions of the connecting pillar 1241 are further provided with third grading rings 1245. Specifically, the support plate 126 is provided with a connecting hole (not shown). The third grading ring 1245 is fixedly connected to the end fitting 1240 through the connecting hole. The third grading ring 1245 may be a circular grading ring, a race-track-shaped grading ring or other special-shaped grading rings, which is not limited herein.

Referring to FIG. 16, in this implementation, the suspension connecting plate 1243 is provided with a through hole 12431. A metal piece 12432 is inserted in the through hole 12431, and the metal piece 12432 is arranged in a hollow structure along an axial direction and configured to allow a locking member (such as a bolt) to pass through to mount the suspension insulator 1220 on the suspension connecting plate 1243.

Specifically, the metal piece 12432 is configured to increase connection strength of the suspension connecting plate 1243 to prevent crack of the suspension connecting plate 1243 under long-term stress. The metal piece 12432 may be made of iron, aluminum or alloy steel, which is not limited herein.

Figure 18:
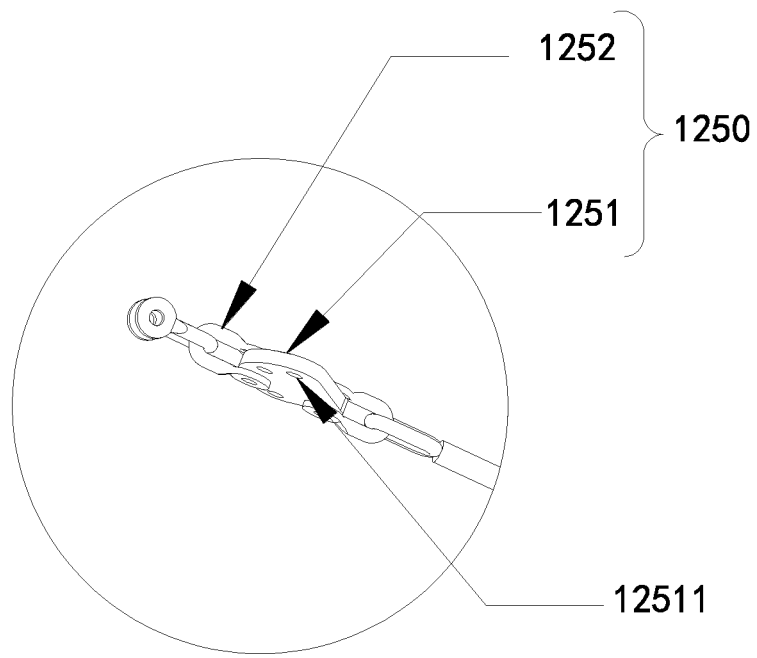
FIG. 18 is a schematic enlarged view of A in FIG. 3.

Referring to FIG. 3 and FIG. 18, in this implementation, the composite crossarm 1200 further includes a second link fitting 1250 configured to connect the tower body 1100 and the suspension insulator 1220. The second link fitting 1250 includes a first sub-link fitting 1251 and a second sub-link fitting 1252.

The first sub-link fitting 1251 is connected to the suspension insulator 1220. The second sub-link fitting 1252 has one end adjustably connected to the first sub-link fitting 1251 and the other end configured to connect the tower body 1100, so as to realize a connection between the suspension insulator 1220 and the tower body 1100. Specifically, the arrangement that the second sub-link fitting 1252 has one end adjustably connected to the first sub-link fitting 1251 enables the composite crossarm 1200 to be structurally variable and to be suitable for different application scenarios.

In an application scenario, as shown in FIG. 18, the first sub-link fitting 1251 is provided with a plurality of mounting portions 12511 arranged in an arc shape, and the second sub-link fitting 1252 is selectively connected to one of the mounting portions 12511. Specifically, the plurality of mounting portions 12511 are arranged in an arc shape, so that a distance and a relative angle between the tower body 1100 and the suspension insulator 1220 are adjustable.

In an application scenario, as shown in FIG. 18, the first sub-link fitting 1251 is a fan-shaped flat fitting, and the second sub-link fitting 1252 is a slotted fitting.

In other implementations, the plurality of mounting portions 12511 may also be arranged linearly along an extension direction of the suspension insulator 1220, which is not limited herein.

In other implementations, it is also possible that the second sub-link fitting 1252 is connected to the suspension insulator 1220 and the first sub-link fitting 1251 is connected to the tower body 1100, which is not limited herein.

Figure 19:
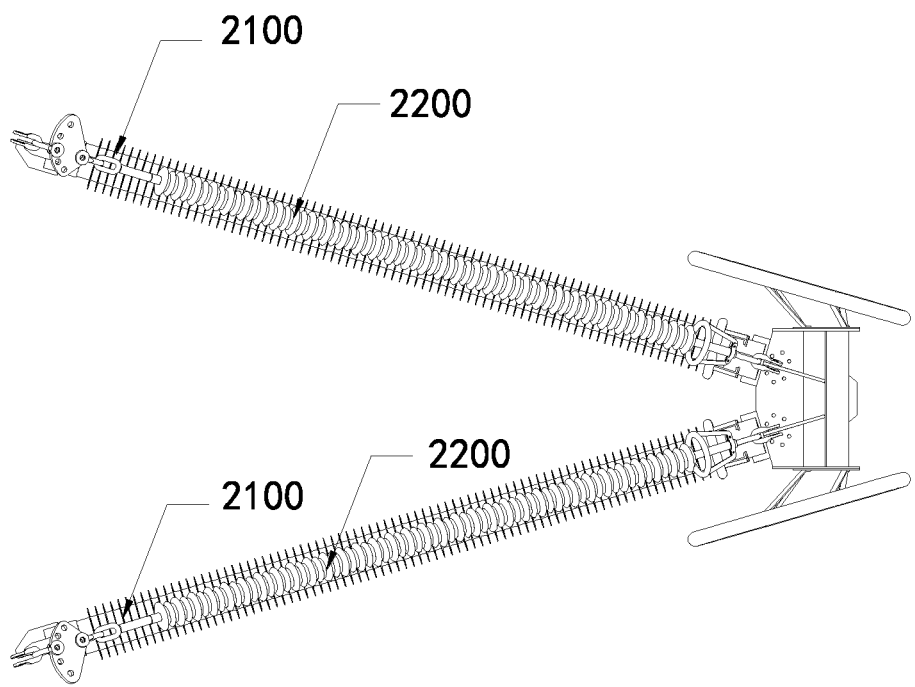
FIG. 19 is a schematic structural diagram of an implementation of a composite crossarm according to the present disclosure.

Referring to FIG. 19, FIG. 19 is a schematic structural diagram of an implementation of a composite crossarm according to the present disclosure. The composite crossarm 2000 includes two post insulators 2100 and two suspension insulators 2200. Of the two post insulators 2100 and the two suspension insulators 2200, one ends are configured to be connected to a tower body of a power transmission tower, and the other ends are connected together to form an end portion of the composite crossarm 2000 to hang a power transmission line. The two suspension insulators 2200 are located on same sides of the two post insulators 2100 and respectively arranged adjacent to the two post insulators 2100. At the same time, an angle between the two post insulators 2100 ranges from 20° to 50°, and an angle between the post insulator 2100 and the suspension insulator 2200 adjacent thereto ranges from 15° to 45°.

The composite crossarm 2000 in this implementation has a same structure as the composite crossarm 1200 in any one of the above implementations, and details may be obtained with reference to the above implementation, which is not described in detail herein.

The above are only implementations of the present disclosure and not thus intended to limit the patent scope of the present disclosure. All equivalent structures or equivalent flow transformations made by virtue of contents of the specification and the drawings of the present disclosure or direct or indirect application of the contents to the other related technical fields shall fall within the protection scope of the present disclosure.

The invention claimed is:

1. A composite crossarm, comprising:
   at least two post insulators and at least two suspension insulators, wherein the at least two post insulators and the at least two suspension insulators have; first ends configured to be connected to a tower body of a power transmission tower, and second ends connected together to form an end portion of the composite crossarm to hang a power transmission line, wherein the at least two suspension insulators are located on a same side of the at least two post insulators and respectively arranged adjacent to the at least two post insulators; and at the same time, an angle between the at least two post insulators ranges from 20° to 50°, and an angle between one of the post insulators and one of the suspension insulators adjacent thereto ranges from 15° to 45°; and
   an end fitting including:
   a connecting pillar that is cylindrical;
   a post connecting plate having a side edge abutting against an outer peripheral surface of the connecting pillar, wherein the second ends of the at least two post insulators not connected to the tower body are spaced on the post connecting plate along an axial direction of the connecting pillar;
   at least two suspension connecting plates arranged on a same side of the post connecting plate and configured to respectively mount the second ends of the at least two suspension insulators not connected to the tower body; and
   a line hanging plate located on the other side of the post connecting plate away from the suspension connecting plate and extending along the outer peripheral surface of the connecting pillar to form a semi-enclosed structure, and configured to hang the power transmission line.

2. The composite crossarm according to claim 1, wherein each post insulator includes an insulating body and a shed cladding a periphery of the insulating body, wherein the insulating body is a solid insulating core, or the insulating body is a hollow insulating tube, an insulating gas is sealed in the hollow insulating tube, and an absolute pressure value of the insulating gas ranges from 0.1 MPa to 0.15 MPa.

3. The composite crossarm according to claim 2, wherein the shed includes a plurality of identical shed bodies spaced radially symmetric with respect to the insulating body.

4. The composite crossarm according to claim 2, wherein each post insulator further includes two first link fittings, each of the first and second ends of the post insulator is connected to a respective first link fitting to mount the post insulator, and each first link fitting comprises:
  a flange cylinder arranged in a hollow structure along an axial direction and sleeving an end portion of the insulating body; a flange plate capping one end of the flange cylinder away from the insulating body; a first connecting plate, in an axial direction of the post insulator, the first connecting plate extending outwards from one side of the flange plate away from the flange cylinder, and in a radial direction of the post insulator, the first connecting plate extending to two opposite sides of the flange cylinder to be connected to the flange cylinder; and
  a second connecting plate having a second connecting plate side edge abutting against a plate surface of the first connecting plate and extending from the first connecting plate to an outer peripheral surface of the flange cylinder, so that a mountable space is formed between the first connecting plate and the second connecting plate;
  wherein the two first connecting plates on the first and second ends of the post insulator are not arranged in parallel.

5. The composite crossarm according to claim 4, wherein an inner wall of the flange cylinder is provided with a plurality of binding grooves spaced along the axial direction and a flow groove communicated with the plurality of binding grooves, wherein the binding grooves and the flow groove are filled with an adhesive to fixedly connect the flange cylinder and the insulating body.

6. The composite crossarm according to claim 5, wherein a plurality of flow grooves are provided, and the plurality of flow grooves are spaced along a circumferential direction of the flange cylinder; or a bottom surface of the flow groove is a plane or a curved surface.

7. The composite crossarm according to claim 5, wherein widths of the plurality of binding grooves are equal, and the width of each binding groove is less than a width of an interval between two adjacent ones of the binding grooves; or
  the width of each binding groove is no more than 12 mm; or
  a ratio of a length of a contact portion between the inner wall of the flange cylinder and the insulating body to an outer diameter of the insulating body ranges from 0.8 to 1.2.

8. A composite crossarm, comprising:
  at least two post insulators and at least two suspension insulators, wherein the at least two post insulators and the at least two suspension insulators have first ends configured to be connected to a tower body of a power transmission tower, and second ends connected together to form an end portion of the composite crossarm to hang a power transmission line, wherein the at least two suspension insulators are located on a same side of the at least two post insulators and respectively arranged adjacent to the at least two post insulators; and
  an angle between the at least two post insulators ranges from 20° to 50°, and an angle between one of the post insulators and one of the suspension insulators adjacent thereto ranges from 15° to 45°;
  wherein each of the post insulators includes an insulating body and a shed cladding a periphery of the insulating body, the insulating body is a solid insulating core, or the insulating body is a hollow insulating tube, an insulating gas is sealed in the hollow insulating tube, and an absolute pressure value of the insulating gas ranges from 0.1 MPa to 0.15 MPa;
  wherein each post insulator further includes two first link fittings, each of first and second ends of the post insulator is connected to a respective first link fitting to mount the post insulator, and each first link fitting includes:
  a flange cylinder arranged in a hollow structure along an axial direction and sleeving an end portion of the insulating body;
  a flange plate capping one end of the flange cylinder away from the insulating body;
  a first connecting plate, in an axial direction of the post insulator, the first connecting plate extending outwards from one side of the flange plate away from the flange cylinder, and in a radial direction of the post insulator, the first connecting plate extending to two opposite sides of the flange cylinder to be connected to the flange cylinder; and
  a second connecting plate having a side edge abutting against a plate surface of the first connecting plate and extending from the first connecting plate to an outer peripheral surface of the flange cylinder, so that a mountable space is formed between the first connecting plate and the second connecting plate;
  wherein the two first connecting plates on the first and second ends of the post insulator are not arranged in parallel;
  wherein an inner wall of the flange cylinder is provided with a plurality of binding grooves spaced along the axial direction and a flow groove communicated with the plurality of binding grooves, wherein the binding grooves and the flow groove are filled with an adhesive to fixedly connect the flange cylinder and the insulating body;
  wherein a plate surface of the flange plate facing the insulating body is provided with a first sealing groove facing an end surface of the insulating body, the first sealing groove being internally provided with a first sealing member; and the inner wall of the flange cylinder is provided with a second sealing groove adjacent to the flange plate, the second sealing groove and the plurality of binding grooves are sequentially spaced in a direction away from the flange plate, and the second sealing groove is internally provided with a second sealing member; wherein a width of the first sealing groove and/or the second sealing groove remains constant or gradually decreases in a direction close to the insulating body.

9. The composite crossarm according to claim 4, wherein the insulating body is the hollow insulating tube, and a plate surface of the flange plate away from the insulating body is provided with a sink, the sink being internally provided with a self-sealing valve; and/or
  the insulating body is internally provided with a drying device, the drying device being mounted on a plate surface of the flange plate close to the insulating body.

10. The composite crossarm according to claim 1, wherein each of the suspension connecting plates is provided with a through hole, a metal piece is inserted in the through hole, and the metal piece is arranged in a hollow structure along an axial direction and configured to allow a locking member to pass through the through hole mount one of the at least two suspension insulators on one of the at least two suspension connecting plates.

11. The composite crossarm according to claim 1, wherein the composite crossarm further includes a second link fitting configured to connect the tower body and one of the at least two suspension insulators, the second link fitting includes:
- a first sub-link fitting connected to one of the at least two suspension insulators; and
- a second sub-link fitting having one end adjustably connected to the first sub-link fitting and the other end configured to connect the tower body, so as to realize a connection between one of the at least two suspension insulators and the tower body.

12. The composite crossarm according to claim 11, wherein the first sub-link fitting is provided with a plurality of mounting portions arranged in an arc shape, and the second sub-link fitting is selectively connected to one of the mounting portions.

13. A power transmission tower, comprising a tower body and the composite crossarm according to claim 1 connected to the tower body.

\* \* \* \* \*